United States Patent [19]

Raabe et al.

[11] 4,093,492

[45] June 6, 1978

[54] COPOLYAMIDES CONTAINING CAPROLACTAM, LAURICLACTAM AND 11-AMINOUNDECANOIC ACID

[75] Inventors: Fritz Raabe, Bonn; Eduard De Jong, Bonn-Beuel, both of Germany

[73] Assignee: Plate Bonn Gesellschaft Mit Beschrankter Haftung, Bonn, Germany

[21] Appl. No.: 548,965

[22] Filed: Feb. 11, 1975

Related U.S. Application Data

[60] Division of Ser. No. 467,234, May 6, 1974, Pat. No. 3,948,844, which is a continuation-in-part of Ser. No. 384,371, Jul. 31, 1973, Pat. No. 3,883,487.

[30] Foreign Application Priority Data

May 12, 1973 Germany .............................. 2324160

[51] Int. Cl.² .............................................. C09J 5/06
[52] U.S. Cl. .................................... 156/331; 156/309; 260/78 R; 260/78 A; 260/78 L; 260/78 S; 427/390 R; 428/474
[58] Field of Search ............... 156/283, 311, 291, 320, 156/307, 331, 309, 332; 428/474, 261, 200, 262, 201, 283, 206, 284, 240, 290, 246; 260/29.2 N, 30.8 R, 31.2 N, 78 A, 78 L, 78 R, 78 S; 427/180, 288, 195, 390 R, 207

[56] References Cited

U.S. PATENT DOCUMENTS

| 2,252,554 | 8/1941 | Carothers | 260/78 R |
| 2,491,934 | 12/1949 | Schlattman | 260/30.8 R |
| 2,499,932 | 3/1950 | Sido | 260/30.8 R |
| 3,355,409 | 11/1967 | Bissot | 260/29.2 N |
| 3,379,696 | 4/1968 | Wiloth | 260/78 R |
| 3,449,287 | 6/1969 | Fairfull et al. | 428/290 |
| 3,471,315 | 10/1969 | Boe et al. | 427/207 |
| 3,515,702 | 6/1970 | Raabe | 260/78 L |
| 3,654,237 | 4/1972 | Kosel et al. | 260/78 A |
| 3,850,887 | 11/1974 | Halas et al. | 156/331 |
| 3,903,351 | 9/1975 | Ando et al. | 156/331 |

FOREIGN PATENT DOCUMENTS

| 1,595,591 | 2/1966 | Germany. |
| 2,007,971 | 2/1970 | Germany. |
| 2,229,308 | 6/1972 | Germany. |

*Primary Examiner*—William A. Powell
*Assistant Examiner*—J. J. Gallagher
*Attorney, Agent, or Firm*—Donald D. Jeffery

[57] ABSTRACT

The invention relates to copolyamides containing caprolactam, lauriclactam and 11-aminoundecanoic acid, useful as heat sealing agents.

12 Claims, No Drawings

COPOLYAMIDES CONTAINING CAPROLACTAM, LAURICLACTAM AND 11-AMINOUNDECANOIC ACID

This is a division of application Ser. No. 467,234, filed May 6, 1974, now U.S. Pat. No. 3,948,844, which is a continuation-in-part of Ser. No. 384,371, filed July 31, 1973, now U.S. Pat. No. 3,883,487.

This invention relates to copolyamides containing caprolactam, lauriclactam and 11-aminoundecanoic acid together with further polyamide-forming components as basic units, to a process for producing these copolyamides and to their use for heat-sealing.

BACKGROUND OF THE INVENTION

Copolyamides of the basic units caprolactam, lauriclactam and 11-aminoundecanoic acid are known from DOS No. 1,595,591. In melt form, these ternary polyamides show high bond strength which is used in the textile industry for heat-sealing fabrics. In addition to high bond strength, these copolyamides show high resistance to solvents of the kind used for dry-cleaning textiles, and to the washing temperatures of up to about 80° C normally encountered in the textile industry. Unfortunately, this resistance is largely governed by a high content of lauriclactam and/or 11-aminoundecanoic acid. Although the resistance of the copolyamides to washing at elevated temperatures increases with increasing content of these basic units, their melting temperature is also increased with the result that conventional copolyamides cannot be used for heat-sealing temperature-sensitive substrates such as leather, temperature-sensitive natural and/or synthetic materials, non-woven fabrics, felts, tufted fabrics and the like. Substances melting below about 115° C, below 110° C or even below 105° C, are required for heat-scaling temperature-sensitive substrates of this kind.

THE INVENTION

The object of the invention is to find substances which are suitable for heat-sealing temperature-sensitive substrates, show high bond strength at low sealing temperatures and during subsequent cooling and which nevertheless are highly resistant to chemical cleaning agents.

The invention relates to copolyamides containing caprolactam, lauriclactam and 11-aminoundecanoic acid as basic units, which are distinguished by the fact that they contain as additional basic unit a hexamethylene diamine salt of an aliphatic dicarboxylic acid of the formula $$HOOC-(CH_2)_n-COOH \qquad (I)$$

in which $n$ is the number 4, 7, 8, 10 or 11, the basic units being incorporated in the copolymer by polymerisation in the following proportions:

| | |
|---|---|
| caprolactam | 20–40% by weight |
| lauriclactam | 20–35% by weight |
| 11-aminoundecanoic acid | 15–35% by weight |
| hexamethylene diamine salt of the acid of formula (I) | 15–40% by weight |

The invention also relates to a process for producing copolyamides containing caprolactam, lauriclactam and 11-aminoundecanoic acid as basic units, distinguished by the fact that the aforementioned basic units and, as additional basic unit, a hexamethylene diamine salt of an aliphatic dicarboxylic acid, corresponding to the formula (I) in which $n$ is 4, 7, 8, 10 or 11, are polymerised under pressure at elevated temperature in the following quantitative proportions:

| | |
|---|---|
| caprolactam | 20–40% by weight |
| lauriclactam | 20–35% by weight |
| 11-aminoundecanoic acid | 15–35% by weight |
| hexamethylene diamine salt of the acid of formula (I) | 15–40% by weight | by methods known per se.

The copolyamides defined above are used for heat-sealing. Surprisingly, they have an extremely low melting point of below 110° C, generally below 100° C and, in some cases, even below 90° C. Despite these low melting points, they show extremely high bond strength after heat-sealing at elevated temperature and, on the other hand, a high resistance to chemical cleaning agents, i.e. solvents and cleaning agents of the kind added to aqueous cleaning solutions. Accordingly, substrates heat-sealed with the copolyamides according to the invention show high resistance to water-containing cleaning agents, even at elevated washing temperatures.

Accordingly, the copolyamides according to the invention can be used with advantage for heat-sealing temperature-sensitive substrates.

Copolyamides of the kind whose basic units are incorporated in the copolymer in the following proportions:

| | |
|---|---|
| caprolactam | 25–35% by weight |
| lauriclactam | ~ 30% by weight |
| 11-aminoundecanoic acid | 18–25% by weight |
| hexamethylene diamine salt of the acid of formula (I) | 15–30% by weight | are preferred for the purposes of the invention. The following quantitative proportions are particularly preferred:

| | |
|---|---|
| caprolactam | ~30% by weight |
| lauriclactam | ~30% by weight |
| 11-aminoundecanoic acid | ~20% by weight |
| hexamethylene diamime salt of the acid of formula (I) | ~20% by weight |

The acids of general formula (I) have the following names:
$n = 4$, adipic acid
$n = 7$, azelaic acid
$n = 8$, sebacic acid
$n = 10$, dodecane dicarboxylic acid
$n = 11$, brassylic acid.

The acids of formula (I) in which $n$ is 6, 7, 8 or 10 are particularly preferred for the purposes of the invention, acids in which $n$ is 7 or 8 being particularly preferred because they are readily available commercial products and lead to copolyamides which can be used with particular advantage for heat-sealing.

According to the invention, the copolyamides are produced by methods known per se. As in the production of C12-polyamide from lauriclactam, temperatures of from about 280° to 300° C, preferably of about 290° C, and pressures of from about 10 to 50 atms, preferably from 15 to 30 atms, are generally used. Polymerisation is continued for several hours under these conditions and is preferably followed by after-condensation for a few hours, preferably for about 1 to 3 hours, at 250° to 300° C. The catalysts, chain terminators and/or other additives and the process conditions normally used for the polymerisation of lauriclactam are employed. More particularly, polymerisation is best carried out in the absense of air, i.e. in an inert gas atmosphere. The copolyamides according to the invention are preferably used for heat-sealing in the form of fine powders which are applied to the substrates to be bonded. A suitable viscosity of the copolyamide where it is used for the production of films is best in the range from about 1.4 to 1.5. This number denotes the solution viscosity of a 0.5% solution of the copolyamide in m-cresol at 25° C.

The copolyamides used in accordance with the invention can contain other additives, for example dyes, in the usual way.

The copolyamides used in accordance with the invention are copolymers which are formed during the polymerisation of a mixture of the polyamide formers. The basic units are condensed into the polymer chain in statistical distribution. The surprising effects described are not obtained in cases where the polyamide formers are polymerised separately from and then melted together with the polyamides.

The copolyamides according to the invention can also have small quantities of other polyamide formers condensed into them.

For reasons of ready accessibility and satisfactory reproducibility of production to form copolyamides with uniform properties, it is generally not advisable to add further polyamide formers.

It is possible by means of the copolyamides according to the invention to bond substrates of many different kinds, particularly temperature-sensitive substrates to substrates of the same or different type. A copolyamide according to the invention is preferably introduced in the form of powder between the surfaces to be bonded. The copolyamide can of course also be used in the other forms, for example films, filaments or chopped filaments. The substrates are then pressed at elevated temperature. The pressing temperature is governed primarily by the temperature-sensitivity of the substrate. Since the copolyamides according to the invention develop outstanding bond strength even at very low sealing temperatures of, for example, from about 100° to 130° C or up to 150° C in dependence upon their melting range, it is possible to apply extremely low sealing temperatures. Cooling to room temperature is accompanied by hardening so that the bonded substrates are firmly united. There is no need for drying or evaporation of solvents.

The copolyamides according to the invention in the form of powders can be applied to a substrate to be bonded, for example by the powder coating machines normally used in the coating industry. In this connection, it is also possible to coat only selected areas of the substrate surface with the copolyamide powder according to the invention. Examples of substrates to be bonded include textiles of natural materials and/or synthetic materials such as wool, silk, cotton and polyesters, polyamides and the like. Other temperature-sensitive substrates such as leather, plastics films and the like, can also be heat sealed using the copolyamides according to the invention.

The copolyamides of the invention can be mixed with plasticizers before being used. Suitable plasticizers are, e.g., sulfonic acid derivatives of the following formula

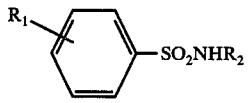

wherein $R_1$ stands for hydrogen or methyl, and $R_2$ for hydrogen, a lower alkyl group, or a cyclohexyl group.

Particularly preferred are benzene- or toluene-sulfonic acid ethyl amide. Corresponding commercial products can be obtained. Such commercial products are, e.g., mixtures of p- and o-toluene sulfonic acid alkyl amides. Phenol carboxylic acid or alkyl esters thereof may also be employed as plasticizers. Examples thereof are butyl-p-hydroxy benzoate, lauryl-p-hydroxybenzoate, p-oxy- benzoic acid, octyl-p-oxybenzoate. Bisphenol A and similar compounds may also be employed as plasticizers. Of course, it is necessary to use in each case plasticizers which are compatible with, or suitable for, the particular copolyamides employed, as is well understood by persons skilled in the art. The plasticizers can be worked into the copolyamides by mixing them with the latter and heating the mixture at temperatures above the melting point. At these temperatures they can, e.g., be extruded, in order to serve for the manufacture of threads, foils, and the like. Powders can also be produced.

When the copolyamides are employed in powder form, it is sometimes suitable to disperse these copolyamide powders in aqueous dispersions, to apply such dispersions, e.g., to textile parts to be joined, especially materials inserted in clothing, e.g., by point coating, then to dry the textiles thus coated, to sinter them, to fix them, and to heat-seal them to the materials to be joined, e.g., by ironing the textiles with a flatiron or with an ironing press (cf., e.g. German Pat. Nos. 2,007,971 and 2,229,308). The dispersions usually contain thickeners and stabilizers in order to produce stable dispersions. Such thickeners and stabilizers are well known to the artisan, e.g., polymeric organic acids, long-chain fatty acids, and the like. It is practical to make the dispersions slightly alkaline. When such dispersions are used, it is particularly preferred not to mix the plasticizers with the copolyamides, as described above, but to add the plasticizers as a further component to the dispersions.

The quantity of plasticizers may amount up to about 50% by weight of the total quantity of copolyamide and plasticizer. Particularly preferred is an amount of plasticizer up to about 25% by weight with relation to the total quantity of copolyamide and plasticizer.

It has already been pointed out above that the copolyamides of the invention may also contain a dyestuff or other customary additives. Thus, the copolyamides may contain, e.g., customary antioxidants, anti-inflammable agents, and particularly optical brighteners as well as fluorescence-causing agents. A wide variety of such agents, which can be obtained as commercial products, are known in the art. Of course, only additives which are resistant to the heat-sealing temperatures applied can be employed.

DESCRIPTION OF PREFERRED EMBODIMENTS

EXAMPLE 1

300 parts by weight of caprolactam, 200 parts by weight of 11-aminoundecanoic acid, 300 parts by weight of lauriclactam, 200 parts by weight of AH-salt (adipic acid hexamethylene diamine salt) and 12 parts by weight of adipic acid as polymerisation-degree regulator, are weighed into an autoclave equipped with stirring mechanism, a gas inlet and a gas outlet. The atmospheric oxygen present inside the autoclave is removed by repeated rinsing under pressure with purified nitrogen.

The reaction mixture is heated to 290° C and the increasing pressure inside the autoclave limited to 25-30 atms by correspondingly setting the valve. The reaction mixture is stirred for 3 hours under these conditions. The pressure is then reduced to normal pressure over a period of 2 hours.

The reaction mixture is then aftercondensed with stirring for 2 hours in the absence of pressure under a gentle stream of nitrogen.

On completion of the pressure-free aftercondensation phase, the temperature is lowered to 160°-180° C and the melt spun through a nozzle in the form of a monofil by means of a gear pump, cooled and granulated.

The resulting granulates have a melting range of from about 90° to 95° C, as measured on a KOFLER heating-stage microscope.

EXAMPLE 2

The following polyamide-forming monomers are reacted under the polycondensation conditions described in Example 1: 200 parts by weight of caprolactam, 250 parts by weight of 11-aminoundecanoic acid and 250 parts by weight of lauriclactam, 300 parts by weight of 6,10-salt, 12 parts by weight of adipic acid. The resulting copolyamide has a melting range of from about 85° to 90° C, as measured on a KOFLER heating-stage microscope.

EXAMPLE 3

A copolyamide is prepared from the following components in the same way as described in Example 1: 250 parts by weight of caprolactam, 250 parts by weight of 11-aminoundecanoic acid, 250 parts by weight of lauriclactam, 250 parts by weight of the salt of azelaic acid and hexamethylene diamine, 12 parts by weight of adipic acid. A copolyamide with a melting range of from about 84° to 88° C is obtained.

EXAMPLE 4

The following monomer combination: 350 parts by weight of caprolactam, 200 parts by weight of 11-aminoundecanoic acid, 300 parts by weight of lauriclactam, 150 parts by weight of 6,12-salt and 12 parts by weight of adipic acid, gives a copolyamide with a melting range of 95° to 105° C under the same polycondensation conditions as in Example 1.

EXAMPLE 5

A copolyamide with a melting range of 90° to 100° C is obtained from the following components under the same polycondensation conditions as in Example 1: 300 parts by weight of caprolactam, 300 parts by weight of 11-aminoundecanoic acid, 200 parts by weight of lauriclactam, 200 parts by weight of 6,13-salt, 12 parts by weight of adipic acid.

EXAMPLES 6 to 21

Copolyamides were prepared from the starting components specified in Table 1 below in accordance with the procedure described in Example 1. The following abbreviations were used:

6 = caprolactam
11 = 11-aminoundecanoic acid
12 = lauriclactam
6.6 = AH-salt (adipic acid hexamethylene diamine salt)
6.9 = hexamethylene diamine azelaic acid salt
6.10 = hexamethylene diamine sebacic acid salt
6.12 = hexamethylene diamine dodecane dicarboxylic acid salt
6.13 = hexamethylene diamine brassylic acid salt The melting temperatures of the copolyamides obtained are also shown in Table 1.

In the individual Examples, the quantities in which the basic units are used can generally be varied by about ± 3% or at least by 1.5% without adversely affecting the properties of the resulting copolyamides to any appreciable extent.

Table 1

| Example | % 6 | % 11 | % 12 | % 6.6 | % 6.9 | % 6.10 | % 6.12 | % 6.13 | Melting range ° C |
|---|---|---|---|---|---|---|---|---|---|
| 6 | 35 | 35 | 20 | 10 | — | — | — | — | 100 – 105 |
| 7 | 35 | 20 | 30 | 15 | — | — | — | — | 103 – 108 |
| 8 | 30 | 30 | 20 | 20 | — | — | — | — | 98 – 104 |
| 1 | 30 | 20 | 30 | 20 | — | — | — | — | 90 – 95 |
| 9 | 25 | 40 | 20 | 15 | — | — | — | — | 105 – 110 |
| 10 | 25 | 25 | 25 | 25 | — | — | — | — | 95 – 100 |
| 11 | 20 | 25 | 25 | — | 30 | — | — | — | 83 – 89 |
| 3 | 25 | 25 | 25 | — | 25 | — | — | — | 84 – 88 |
| 12 | 30 | 20 | 30 | — | 20 | — | — | — | 88 – 95 |
| 13 | 30 | 15 | 20 | — | 35 | — | — | — | 85 – 90 |
| 14 | 35 | 35 | 20 | — | — | 10 | — | — | 100 – 108 |
| 15 | 35 | 20 | 30 | — | — | 15 | — | — | 97 – 107 |
| 16 | 30 | 20 | 30 | — | — | 20 | — | — | 90 – 95 |
| 17 | 30 | 25 | 25 | — | — | 20 | — | — | 82 – 90 |
| 18 | 30 | 30 | 20 | — | — | 20 | — | — | 90 – 95 |
| 19 | 25 | 25 | 25 | — | — | 25 | — | — | 85 – 90 |
| 2 | 20 | 25 | 25 | — | — | 30 | — | — | 86 – 91 |
| 20 | 30 | 30 | 20 | — | — | 20 | — | — | 95 – 100 |
| 21 | 35 | 20 | 30 | — | — | 15 | — | — | 95 – 105 |
| 4 | 35 | 20 | 30 | — | — | — | 15 | — | 95 – 105 |
| 5 | 30 | 30 | 20 | — | — | — | — | 20 | 90 – 100 |

COMPARISON TEST

In this comparison test, the bond strength of a copolyamide according to the invention is compared with that of a copolyamide containing only the basic units caprolactam, 11-aminoundecanoic acid and lauriclactam.

A copolyamide is prepared as described in Example 1 from the following monomer constituents: 25% by weight of caprolactam, 25% by weight of 11-aminoundecanoic acid, 25% by weight of lauriclactam, 25% by weight of azelaic acid hexamethylene diamine salt and 2% by weight of azelaic acid as polymerisation-degree regulator. A transparent polyamide melting at 80° to 90° C, as measured on a KOFLER heating-stage microscope, and having a melt index at 130° C of 22, as measured in accordance with DIN 53 735, is obtained.

For comparison, a ternary copolyamide is prepared from the following constituents: 34% by weight of caprolactam 33% by weight of 11-aminoundecanoic acid, 33% by weight of lauriclactam and 1.5% by weight of azelaic acid as polymerisation degree regulator. A copolyamide melting at 110° to 115° C and having a melt index of 22, as measured in accordance with DIN 53 735, is obtained.

The polyamides were each ground while cooling and separated by sifting into a fraction of 0 to 200 mm.

The two powder fractions were applied to a conventional interlining material in an 11-mesh pattern in an amount of 16±1 g per m² by means of a powder pointing machine of the kind normally used in the coating industry.

The coated interlinings thus obtained were ironed with a polyester/cotton fabric under a constant pressure of 350 p/cm² in an electrically heated ironing press of the kind commonly used in the garment industry, both the plate temperature and the contact time being varied.

The delamination strengths of 2.5 cm wide laminate strips were measured with a tension tester.

The delamination strengths (p/2.5 cm) specified in Table 2 were measured:

Table 2

| Contact time (secs) | Plate temperature of the ironing press (° C) | | | | | | | |
|---|---|---|---|---|---|---|---|---|
| | 110 | 120 | 130 | 140 | 150 | 160 | 170 | |
| 6 | 300 | 400 | 500 | 700 | 1000 | 900 | 900 | Invention |
| | — | — | 100 | 200 | 400 | 300 | 300 | Comparison |
| 10 | 400 | 500 | 800 | 1100 | 1000 | 1100 | 1600 | Invention |
| | — | — | 200 | 300 | 400 | 500 | 500 | Comparison |
| 15 | 450 | 700 | 900 | 1200 | 1400 | 1400 | 1300 | Invention |
| | — | — | 250 | 350 | 500 | 700 | 600 | Comparison |
| 18 | 600 | 900 | 900 | 1300 | 1500 | 1400 | 1700 | Invention |
| | — | — | 300 | 600 | 500 | 600 | 750 | Comparison |

It can be seen from the Table that extremely good adhesion is obtained even at very low plate temperatures of the ironing press, i.e. at very low sealing temperatures of 110° and 120° C, whereas no adhesion is obtained with the conventional copolyamide at these sealing temperatures. The conventional copolyamide only produces firm adhesion at higher sealing temperatures.

What is claimed is:

1. A process for heat-sealing together surfaces of materials comprising applying to at least one of the surfaces to be sealed a composition comprising a copolyamide having a melting range below about 110° C and consisting essentially of recurring units of caprolactam, lauriclactam, 11-aminoundecanoic acid and a hexamethylene diamine salt of an aliphatic dicarboxylic acid of the formula:

HOOC—(CH$_2$)$_n$—COOH    (I)

in which $n$ is 4, 7, 8, 10 or 11, joining said surfaces, heating the materials to be sealed to a temperature sufficient to melt the copolyamide and cooling the materials.

2. The process as defined by claim 1, wherein the units are incorporated in the copolyamide in the following proportions:

| | |
|---|---|
| caprolactam | 20-40% by weight |
| lauriclactam | 20-35% by weight |
| 11-aminoundecanoic acid | 15-35% by weight |
| hexamethylene diamine salt of the acid of formula (I) | 15-40% by weight. |

3. The process as defined by claim 1, wherein the units are incorporated in the copolyamide in the following proportions:

| | |
|---|---|
| caprolactam | about 30% by weight |
| lauriclactam | about 30% by weight |
| 11-aminoundecanoic acid | about 20% by weight |
| hexamethylene diamine salt of the acid of formula (I) | about 20% by weight. |

4. The process as defined by claim 1, wherein $n$ in the formula (I) stands for the number 4, 7, 8 or 10.

5. The process as defined by claim 1, wherein $n$ in the formula (I) is 7 or 8.

6. The process as defined by claim 1, wherein said composition further comprises a plasticizer.

7. The process as defined by claim 6, wherein said plasticizer is present in an amount up to about 50% by weight by the total composition.

8. The process as defined by claim 6, wherein said plasticizer is present in an amount up to about 25% by weight of the total composition.

9. The process as defined by claim 6, wherein said plasticizer is selected from the group consisting of a sulfonic acid derivative of the formula

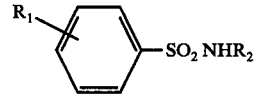

wherein R$_1$ is hydrogen or methyl and R$_2$ is hydrogen, lower alkyl or cyclohexyl; a phenol carboxylic acid; a phenol carboxylic acid alkyl ester and Bisphenol A.

10. The method as defined by claim 9, wherein said plasticizer is selected from the group consisting of benzene sulfonic acid ethyl amide, toluene sulfonic acid ethyl amide, butyl-p-hydroxy benzoate, lauryl-p-hydroxy-benzoate, p-oxy-benzoic acid, octyl-p-oxy benzoate and Bisphenol A.

11. The method as defined by claim 10, wherein said composition further comprises an aqueous dispersant.

12. The process as defined by claim 1, wherein the units are incorporated in the copolyamide in the following proportions:

| | |
|---|---|
| caprolactam | 25-35% by weight |
| lauriclactam | about 30% by weight |
| 11-aminoundecanoic acid | 18-25% by weight |
| hexamethylene diamine salt of the acid of formula (I) | 15-30% by weight. |

* * * * *